US010705528B2

(12) United States Patent
Wierzynski et al.

(10) Patent No.: US 10,705,528 B2
(45) Date of Patent: Jul. 7, 2020

(54) AUTONOMOUS VISUAL NAVIGATION

(71) Applicant: QUALCOMM Incorporated, San Diego, CA (US)

(72) Inventors: Casimir Matthew Wierzynski, La Jolla, CA (US); Bardia Fallah Behabadi, San Diego, CA (US); Sarah Paige Gibson, Del Mar, CA (US); Aliakbar Aghamohammadi, San Diego, CA (US); Saurav Agarwal, College Station, TX (US)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 15/249,250

(22) Filed: Aug. 26, 2016

(65) Prior Publication Data

US 2017/0168488 A1 Jun. 15, 2017

Related U.S. Application Data

(60) Provisional application No. 62/267,886, filed on Dec. 15, 2015.

(51) Int. Cl.
*G05D 1/02* (2020.01)
*G01C 21/00* (2006.01)
*G01C 21/20* (2006.01)
*G05D 1/00* (2006.01)
*G06K 9/00* (2006.01)
*G06T 17/05* (2011.01)

(52) U.S. Cl.
CPC ........... *G05D 1/0212* (2013.01); *G01C 21/00* (2013.01); *G01C 21/206* (2013.01); *G05D 1/0061* (2013.01); *G05D 1/0231* (2013.01); *G05D 1/0251* (2013.01); *G05D 1/0253* (2013.01); *G05D 1/0255* (2013.01); *G05D 1/0274* (2013.01); *G06K 9/00664* (2013.01); *G06K 9/00805* (2013.01); *G06T 17/05* (2013.01); *G06T 2207/10012* (2013.01); *G06T 2207/10028* (2013.01)

(58) Field of Classification Search
None
See application file for complete search history.

(56) References Cited

U.S. PATENT DOCUMENTS

| 13,588,411 | 11/2013 | Hsieh et al. |
| 9,213,905 B2 | 12/2015 | Lange et al. |

(Continued)

OTHER PUBLICATIONS

Rusu, Radu Bogdan, "Leaving Flatland: Efficient Real-Time Three-Dimensional Perception and Motion Planning", 2009, Journal of Field Robotics 26(10) 841-862, Wiley Periodicals, Inc, 841-862.*

(Continued)

*Primary Examiner* — Chan S Park
*Assistant Examiner* — Elisa M Rice
(74) *Attorney, Agent, or Firm* — Seyfarth Shaw LLP

(57) ABSTRACT

A method of visual navigation for a robot includes integrating a depth map with localization information to generate a three-dimensional (3D) map. The method also includes motion planning based on the 3D map, the localization information, and/or a user input. The motion planning overrides the user input when a trajectory and/or a velocity, received via the user input, is predicted to cause a collision.

40 Claims, 14 Drawing Sheets

(56) References Cited

U.S. PATENT DOCUMENTS

| | | | |
|---|---|---|---|
| 2003/0030398 A1* | 2/2003 | Jacobs | G05D 1/0225 318/568.12 |
| 2008/0243383 A1* | 10/2008 | Lin | G01C 21/165 701/469 |
| 2010/0063663 A1 | 3/2010 | Tolstedt et al. | |
| 2010/0082194 A1* | 4/2010 | Yabushita | G05D 1/0217 701/25 |
| 2012/0253582 A1* | 10/2012 | Chrysanthakopoulos | G05D 1/024 701/26 |
| 2014/0320593 A1 | 10/2014 | Pirchheim et al. | |
| 2014/0355869 A1* | 12/2014 | Gershenson | G06T 7/246 382/154 |
| 2015/0134146 A1 | 5/2015 | Pack et al. | |
| 2017/0148168 A1* | 5/2017 | Lindner | G06T 7/0075 |
| 2018/0004217 A1* | 1/2018 | Biber | G05D 1/0221 |

OTHER PUBLICATIONS

D. Maier, A. Hornung and M. Bennewitz, "Real-time navigation in 3D environments based on depth camera data," 2012 12th IEEE-RAS International Conference on Humanoid Robots (Humanoids 2012), Osaka, 2012, pp. 692-697. (Year: 2012).*

E. Yoshida, C. Esteves, I. Belousov, J. Laumond, T. Sakaguchi and K. Yokoi, "Planning 3-D Collision-Free Dynamic Robotic Motion Through Iterative Reshaping," in IEEE Transactions on Robotics, vol. 24, No. 5, pp. 1186-1198, Oct. 2008. doi: 10.1109/TRO.2008. 2002312 (Year: 2008).*

International Search Report and Written Opinion—PCT/US2016/059171—ISA/EPO—Jan. 24, 2017.

Bohlin R., et al., "Path Planning Using Lazy PRM", Proceedings of the 2000 IEEE International Conference on Robotics and Automation (ICRA'00), Apr. 24, 2000 (Apr. 24, 2000), vol. 1, pp. 521-528, XP010500267, DOI:10.1109/ROBOT.2000.844107.

Forster C., et al., "SVO: Fast Semi-Direct Monocular Visual Odometry," IEEE International Conference on Robotics and Automation (ICRA), 2014, 8 pages.

Fraundorfer F., et al., "Visual Odometry: Part II: Matching, Robustness, Optimization, and Applications," IEEE Robotics & Automation Magazine, vol. 19, No. 2, Jun. 2012, pp. 78-90.

Hernandez J., et al., "Observability, Identifiability and Sensitivity of Vision-Aided Inertial Navigation," IEEE International Conference on Robotics and Automation (ICRA), 2015, pp. 1-7.

Hornung A., et al., "OctoMap: An Efficient Probabilistic 3D Mapping Framework Based on Octrees," Autonomous Robots, 2013, vol. 34, No. 3, pp. 189-206.

Izadi S., et al., "KinectFusion: Real-Time 3D Reconstruction and Interaction using a Moving Depth Camera," Proceedings of the 24th annual ACM symposium on User interface software and technology (UIST), 2011, pp. 559-568.

Karaman S., et al., "Sampling-Based Algorithms for Optimal Motion Planning," The International Journal of Robotics Research, 2011, vol. 30, No. 7, pp. 846-894.

Kavraki L.E., et al., "Probabilistic Roadmaps for Path Planning in High-Dimensional Configuration Spaces," IEEE transactions on Robotics and Automation, 1996, vol. 12, No. 4, pp. 566-580.

Lavalle S.M., et al., "Randomized kinodynamic planning," The International Journal of Robotics Research, 2001, vol. 20, No. 5, pp. 378-400.

Bachrach A., et al., "Estimation, Planning and Mapping for Autonomous Flight Using an RGB-D Camera in GPS-denied Environments," The International Journal of Robotics Research, 2012, pp. 1-38.

Maier D., et al., "Real-Time Navigation in 3D Environments Based on Depth Camera Data," 12th IEEE-RAS International Conference on Humanoid Robots (Humanoids), 2012, pp. 692-697.

* cited by examiner

AUTONOMOUS VISUAL NAVIGATION

CROSS REFERENCE TO RELATED APPLICATION

This application claims the benefit under 35 U.S.C. § 119(e) to U.S. Provisional Patent Application No. 62/267,886, entitled "AUTONOMOUS VISUAL NAVIGATION," filed on Dec. 15, 2015, the disclosure of which is expressly incorporated herein by reference in its entirety.

BACKGROUND

Field

Certain aspects of the present disclosure generally relate to robotics and, more particularly, to onboard vision-based localization, mapping, and planning.

Background

Robots may be designed to perform behaviors or tasks with a high degree of autonomy. A robot may use different modules and components for performing various tasks. For example, the robot may have different components for localization, mapping and planning. Localization is directed to solving the problem of determining where the robot is located. The robot receives input from its sensors to understand where the robot is located within its environment.

Mapping is directed to building a representation of the environment. For example, mapping is used to determine which portion of the environment is occupied and which parts are free space. Furthermore, mapping may prevent the robot from colliding with obstacles.

Planning is directed to determining how to perform a task after the robot knows the layout of the environment and how it will travel from point A to B. That is, in some cases, prior to moving from a current position to a target, it is desirable to determine the trajectory (e.g., path) to the target with the lowest cost from multiple candidate trajectories evaluated during a planning phase.

SUMMARY

In one aspect of the present disclosure, a method of visual navigation for a robot is disclosed. The method includes integrating a depth map with localization information to generate a three-dimensional (3D) map. The method also includes motion planning based on the 3D map, the localization information, or a user input. The motion planning overrides the user input when the user input is predicted to cause a collision.

Another aspect of the present disclosure is directed to an apparatus including means for integrating a depth map with localization information to generate a three-dimensional map. The apparatus also includes means for motion planning based on the 3D map, the localization information, or a user input. The motion planning overrides the user input when the user input is predicted to cause a collision.

In another aspect of the present disclosure, a non-transitory computer-readable medium with non-transitory program code recorded thereon is disclosed. The program code for visual navigation for a robot is executed by a processor and includes program code to integrate a depth map with localization information to generate a three-dimensional map. The program code also includes program code to motion plan based on the 3D map, the localization information, or a user input. The motion planning overrides the user input when the user input is predicted to cause a collision.

Another aspect of the present disclosure is directed to an apparatus having a memory unit and one or more processors coupled to the memory unit. The processor(s) is configured to integrate a depth map with localization information to generate a three-dimensional map. The processor(s) is also configured to motion plan based on the 3D map, the localization information, or a user input. The motion planning overrides the user input when the user input is predicted to cause a collision.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
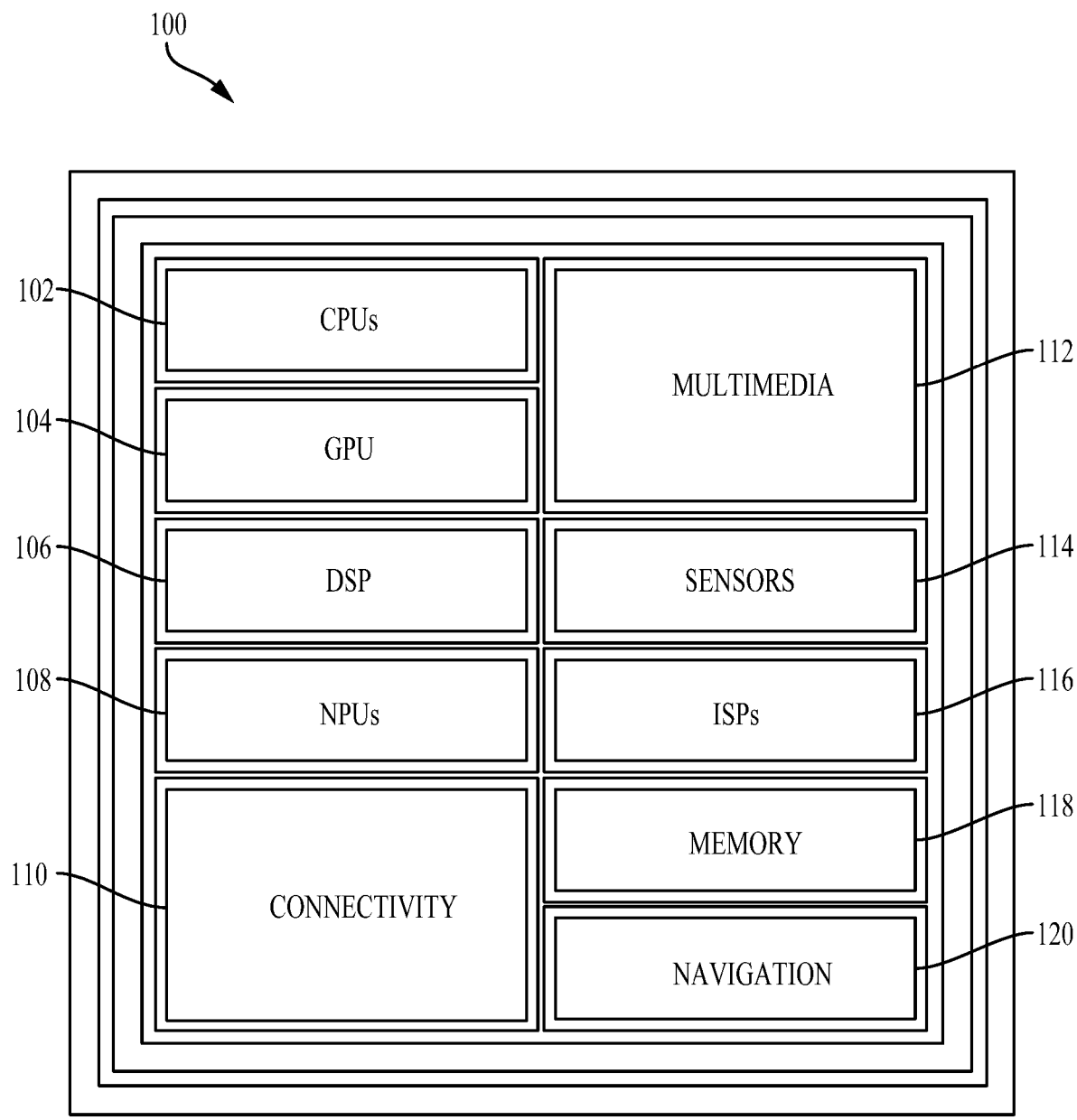
FIG. 1 illustrates an example implementation of autonomous visual navigation using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Aspects of the present disclosure are directed to an integrated solution that combines localization mapping and motion planning. The integrated solution achieves motion planning based on a depth map and localization information. A localization module, such as a visual-inertial odometer, may be used for localization. Obstacle mapping may be achieved by volumetric integration of successive, multi-view depth measurements. Planning may be achieved by sampling-based geometric planning combined with fast re-planning.

For systems, such as robots, that may be either manually or autonomously controlled, it is desirable to plan a motion of the robot based on an integrated depth map. Furthermore, the motion planning may include overriding user input.

Additionally, it is desirable to safely pilot a robot both manually (e.g., stick control) and autonomously (e.g., way-point control). Operators further desire to apply information gathered during manual operation to autonomous operation, and vice versa. Furthermore, planning may be specified to prevent a robot from colliding into obstacles, both in manual and autonomous modes. Planning may also be specified to plan the lowest cost route when the robot is operating in either a manual or an autonomous mode.

Furthermore, a robot may localize itself, such that the robot does not rely on external systems or signals (e.g., global positioning systems and beacons) for localization. In one configuration, the robot includes sensors that improve light and energy use.

Aspects of the present disclosure are directed to a robot with onboard vision-based localization, mapping, and planning such that the robot can motion plan to target locations. In one configuration, the motion planning overrides a user input.

FIG. 1 illustrates an example implementation of the aforementioned method of motion planning by a robot using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system.

The SOC 100 may be based on an ARM instruction set. In an aspect of the present disclosure, the instructions loaded into the general-purpose processor 102 may comprise code for determining a probability distribution function (PDF) of an occupancy level for a location. The instructions loaded into the general-purpose processor 102 may also comprise code for integrating a depth map with localization information to generate a three-dimensional (3D) map. The instructions loaded into the general-purpose processor 102 may also comprise code for planning motion based on the 3D map, the localization information, and/or a user input. In one configuration, the motion planning overrides the user input when the user input is predicted to cause a collision.

Figure 2:
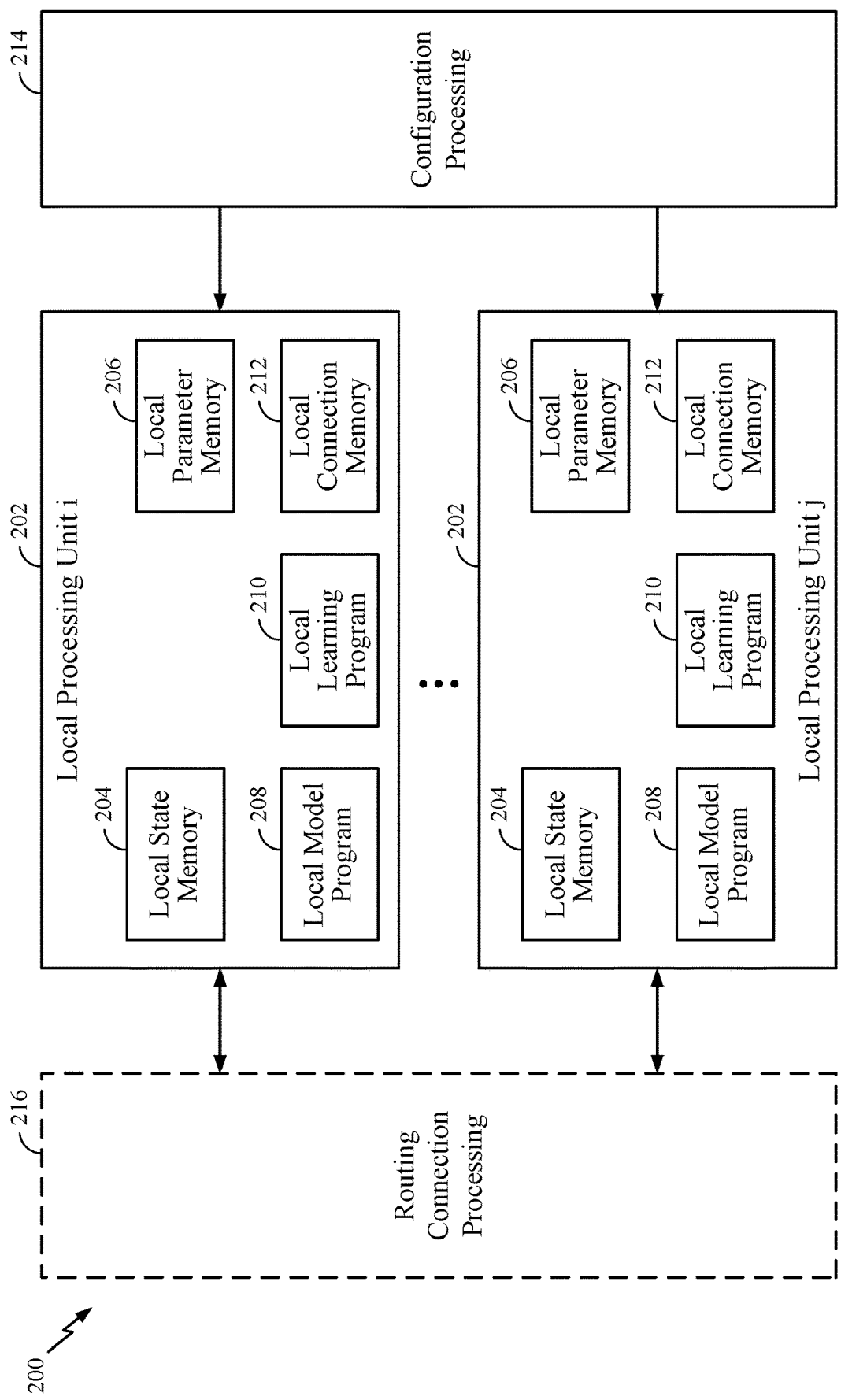
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

In one configuration, a navigation model is configured for integrating a depth map with localization information to generate a three-dimensional (3D) map and motion planning based on the 3D map, the localization information, and/or a user input. In one aspect, the aforementioned means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

Autonomous Visual Navigation

In conventional systems, during manual operation, robots may use a virtual bumper system based on a reactive (e.g., memoryless) system, such as sonar or ultrasound, to halt the robot if the range between the robot and an obstacle is less than a threshold. The virtual bumper may not be useful during autonomous operation because the virtual bumper system is memoryless. Therefore, an autonomous robot cannot plan based on previous measurements. Furthermore, the virtual bumper system does not integrate sensor readings across time and pose. Thus, the system has increased noise. Furthermore, because the virtual bumper system is reactive, the virtual bumper system cannot plan a new trajectory and/or velocity to avoid a collision. Rather, the robot halts operation to avoid a collision and is not redirected around obstacles.

Additionally, in conventional systems for autonomous operation, a waypoint-based scheme is specified to allow the user to specify location-based waypoints, such as GPS waypoints, for navigation. In this system, a robot is specified to move from one waypoint to another waypoint. Still, the waypoint-based scheme uses a location system, such as GPS, which may be unreliable in some locations, such as indoor locations or urban locations. Furthermore, the waypoint-based scheme does not redirect the robot around obstacles.

Accordingly, it is desirable to combine different components into one robot to improve navigation and an understanding of the robot's environment. The different components may include a localization module, such as a visual-inertial odometer, for determining location of the robot in an environment; a mapping module for obtaining multi-view depth measurements; and a planning module for sampling-based geometric planning combined with re-planning. That is, as previously discussed, aspects of the present disclosure are directed to a robot that combines localization mapping and motion planning. More specifically, motion planning may use the depth map and the localization information.

According to aspects of the present disclosure, the combined components may be used for motion planning based on an obstacle map generated from a mapping module, localization information obtained from the localization module, and planning based on a user input and/or the planning module. In one configuration, the robot receives user input for a trajectory and/or velocity. In this configuration, the robot may override the user input to avoid collisions based on obstacles determined from the mapping module. The robot may also override the user input to improve the route, such as selecting a route that uses less fuel and/or selecting a route that is short in distance and/or time.

The robot may include multiple sensor modalities, such as a vision sensor and a localization sensor. The mapping module may use a stereo-vision sensor, such as multiple forward facing cameras to obtain a depth map. The depth measurements may be performed at each time step to determine a distance of multiple points from the robot. Furthermore, the mapping module may be specified for a volumetric integration of successive depth measurements (e.g., multi-view depth measurements). The robot may obtain localization information from the inertial measurement unit, such as accelerometers and/or gyroscopes. The localization information may also be obtained from sensors, such as downward facing sensors. Localization refers to the location of the robot within an environment. In one configuration, the downward facing sensor is a sonar sensor and/or a camera.

In one aspect of the disclosure, the robot integrates each received depth measurement with the measurements of a localization module to place the depth measurements into an appropriate position in a map, such as a three-dimensional (3D) map. For example, the robot may obtain depth measurements at a first location and the robot associates the measurements with the first location of the robot. Additionally, the robot may move from the first location to a second location and obtain new depth measurements. Furthermore, the robot may associate the new depth measurements with the second location. Accordingly, the map, such as a three-dimensional map, is generated based on the depth measurements and localization measurements as the robot moves through an environment.

During the planning stage, the robot may provide motion control based on a mode of operation, such as a manual mode or an autonomous mode. For example, in the manual mode of operation, the autonomous system extrapolates a pilot's command (e.g., user input) for velocity and/or trajectory into the three-dimensional map and checks for collisions. Furthermore, the robot may override the user input to avoid a collision or to plan an improved route (e.g., faster route). In the autonomous mode of operation, the robot uses an accumulated map to plan a collision-free path to a saved goal. Furthermore, the autonomous system may re-plan along the route if map updates render a plan unsafe.

Figure 3:
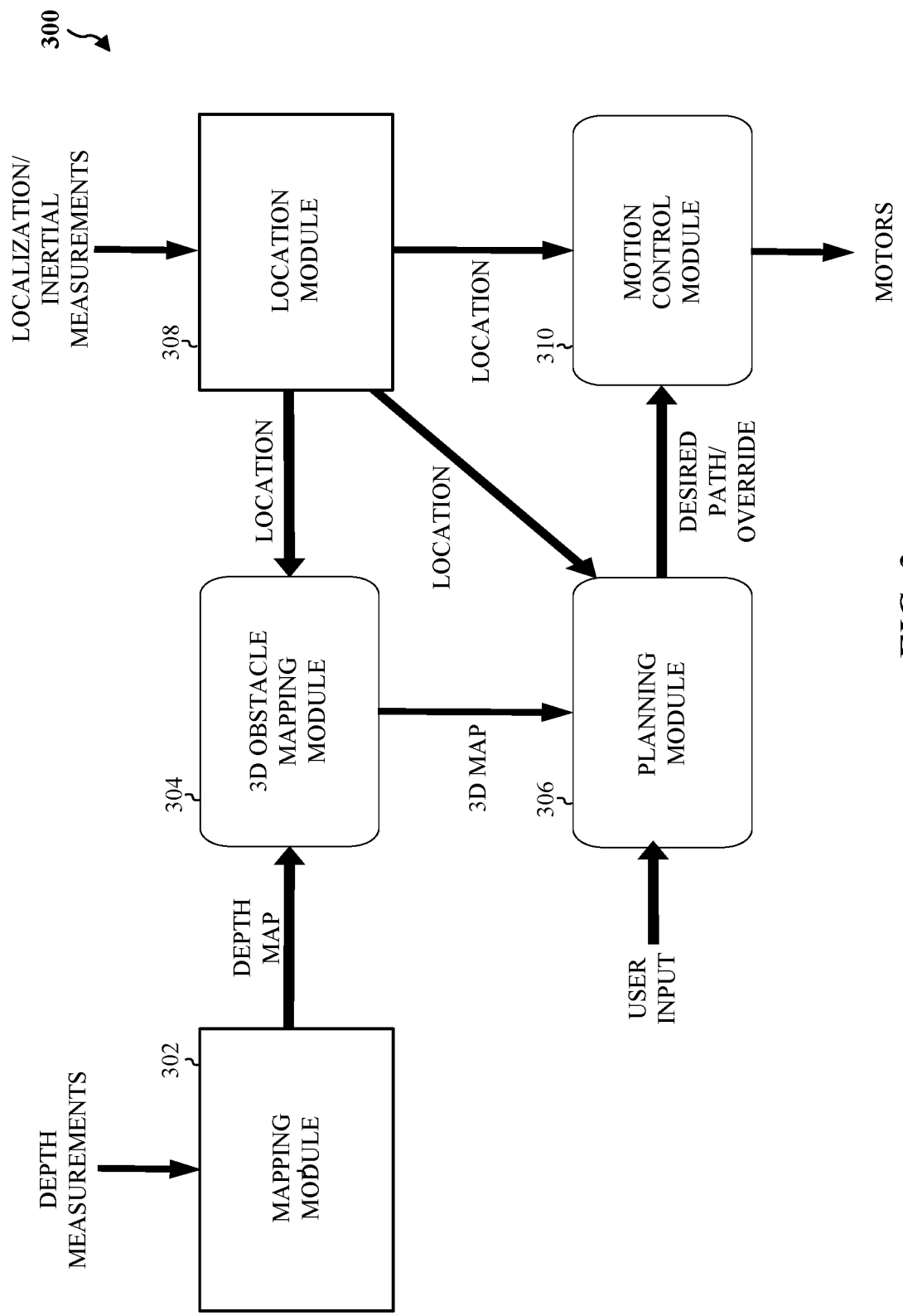
FIG. 3 is a block diagram illustrating different modules/means/components in an exemplary apparatus.

FIG. 3 is a block diagram of a robot 300 according to an aspect of the present disclosure. As shown in FIG. 3, the robot 300 includes a mapping module 302, which receives depth measurements from a depth sensor. The depth measurements measure the robot's distance from obstacles. In one configuration, the depth sensor includes multiple forward facing vision sensors, such as cameras. The mapping module 302 may generate a depth map based on the depth measurements. Furthermore, the depth map may be input to a 3D obstacle mapping module 304. The input of the depth map may be substantially instantaneous.

As shown in FIG. 3, a location module 308 receives localization measurements and/or inertial measurements. The localization measurements may be obtained from a downward facing sensor, such as a downward facing camera. Furthermore, the inertial measurements may be obtained from the inertial measurement unit, such as accelerometers and/or gyroscopes. Based on the received localization measurements and/or inertial measurements, the location module 308 determines the robot's location and outputs the location to the 3D obstacle mapping module 304. The input of the location information may be substantially instantaneous.

The 3D obstacle mapping module 304 associates the received location information with the received depth map to generate a 3D map of the robot's current location. The 3D map may be referred to as an integrated depth map. Over time, as the robot 300 moves to different locations and obtains depth measurements from the different locations, a 3D map of the visited locations is generated. The 3D map is output to a planning module 306. In one configuration, the robot 300 receives a user input to move the robot 300 at a specific velocity and/or trajectory. Additionally, the user input may set a goal for the robot 300 to reach. The user input may be received from a remote device, such as a computer or remote controller.

In one configuration, when the user input sets a goal for the robot 300, the planning module 306 plans a route from the robot's current position to the goal. The desired path is output to the motion control module 310, which controls the robot's motors to move along the planned route at the desired trajectory and/or velocity. The motors may control a locomotion component, such as engines, rotary blades, and/or wheels. Furthermore, as shown in FIG. 3, the location module 308 transmits the obtained location to both the planning module 306 and the motion control module 310 so that both modules are aware of the robot's current location. Additionally, as the location of the robot 300 changes, the 3D map generated from the 3D obstacle mapping module 304 may be updated. Thus, the planning module may update the desired path based on updates to the 3D map.

In another configuration, as discussed above, the robot 300 receives a user input to move the robot 300 at a specific velocity and/or trajectory. In this configuration, the planning module 306 overrides the user input to avoid a collision or to improve the specified velocity and/or trajectory based on the current location in the 3D map. The override information may be output to the motion control module 310 to control the robot's motors based on the override information. Of course, in some cases, the planning module may not override the user input. Thus, the user input is output from the planning module 306 to the motion control module 310 as the desired path.

Figure 4:
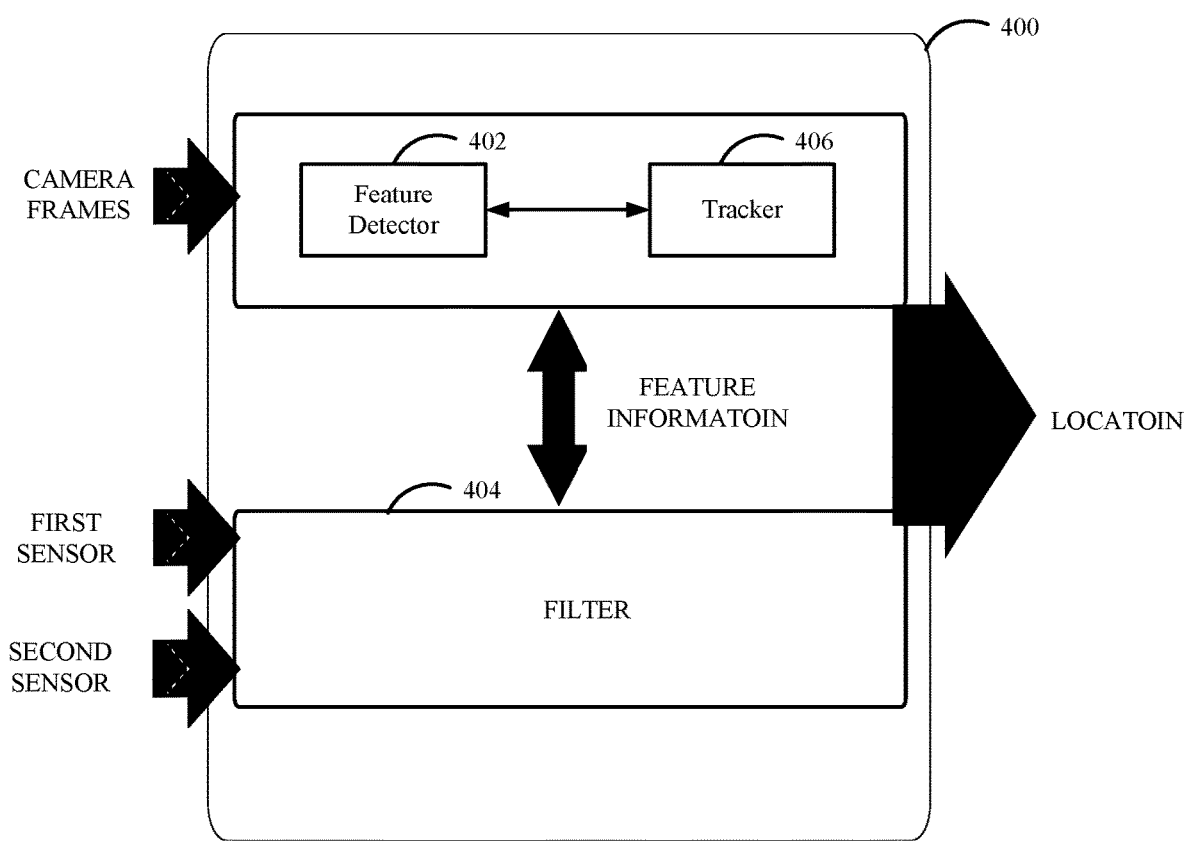
FIG. 4 is a block diagram illustrating a location module according to aspects of the present disclosure.

FIG. 4 illustrates an example of a location module 400 according to an aspect of the present discourse. The location module 400 may be a sensor fusion module that combines inertial measurement unit (IMU) data and sensor data to compute a robot's pose in a global/world coordinate frame. In one configuration, the sensor for the location module is a downward facing sensor. Still, aspects of the present disclosure are not limited to a downward facing sensor. As shown in FIG. 4, the location module 400 may include a feature detector 402, a tracker 406, and a filter 404. In one configuration, the filter 404 is an extended Kalman filter. According to an aspect of the present disclosure, the feature detector receives frames from a downward facing sensor, such as a camera. In one configuration, the camera is a monocular camera.

The feature detector 402 may be configured to detect features of a received frame. Furthermore, the tracker 406 may track the detected changes in the position of the features across received frames to estimate the robot's movement. For example, the feature detector 402 may detect ten features in a first frame. Additionally, in this example, the tracker 406 may track the detected ten features in subsequent frames. Thus, when a second frame is received at the feature detector 402, the feature detector 402 attempts to detect the ten features of the first frame from the second frame and the tracker 406 determines the change in position of the ten features of the first frame from the ten features of the second frame. The change in position provides an estimate of the robot's movement (e.g., how far the robot has moved). Of course, ten features is an example and aspects of the present disclosure are not limited to detecting a specific number of features.

Additionally, as shown in FIG. 4, a filter 404 may receive input from a first sensor and a second sensor. The first sensor may be an accelerometer to sense linear acceleration due to self-motion and the force of gravity. The second sensor may be a gyroscope to obtain an orientation (e.g., angles) of a three-dimensional global location. For visual-inertial odometry, the world frame may be centered on a location of a first captured image. Thus, relative to a robot's starting position, visual-inertial odometry provides an estimate of a three-dimensional global location and corresponding orientation. For example, the three-dimensional global location and corresponding orientation information may be input to a trajectory controller for waypoint navigation or velocity control. The three-dimensional global location and corresponding orientation information may also be input to a mapping of a subsystem for voxel map integration.

In one configuration, the filter combines the input of the first sensor, the second sensor, and the feature information from the feature detector 402 and tracker 406 to output a location of the robot. The robot's location may be output as a six-degree of freedom (6 DOF) pose. The six-degree of freedom pose may refer to forward/back, up/down, left/right, pitch, yaw, and roll. In one configuration, the robot is configured to fly. Of course, aspects of the present disclosure are not limited to a flying robot and are contemplated for a robot that may be land and/or sea based.

Figure 5:
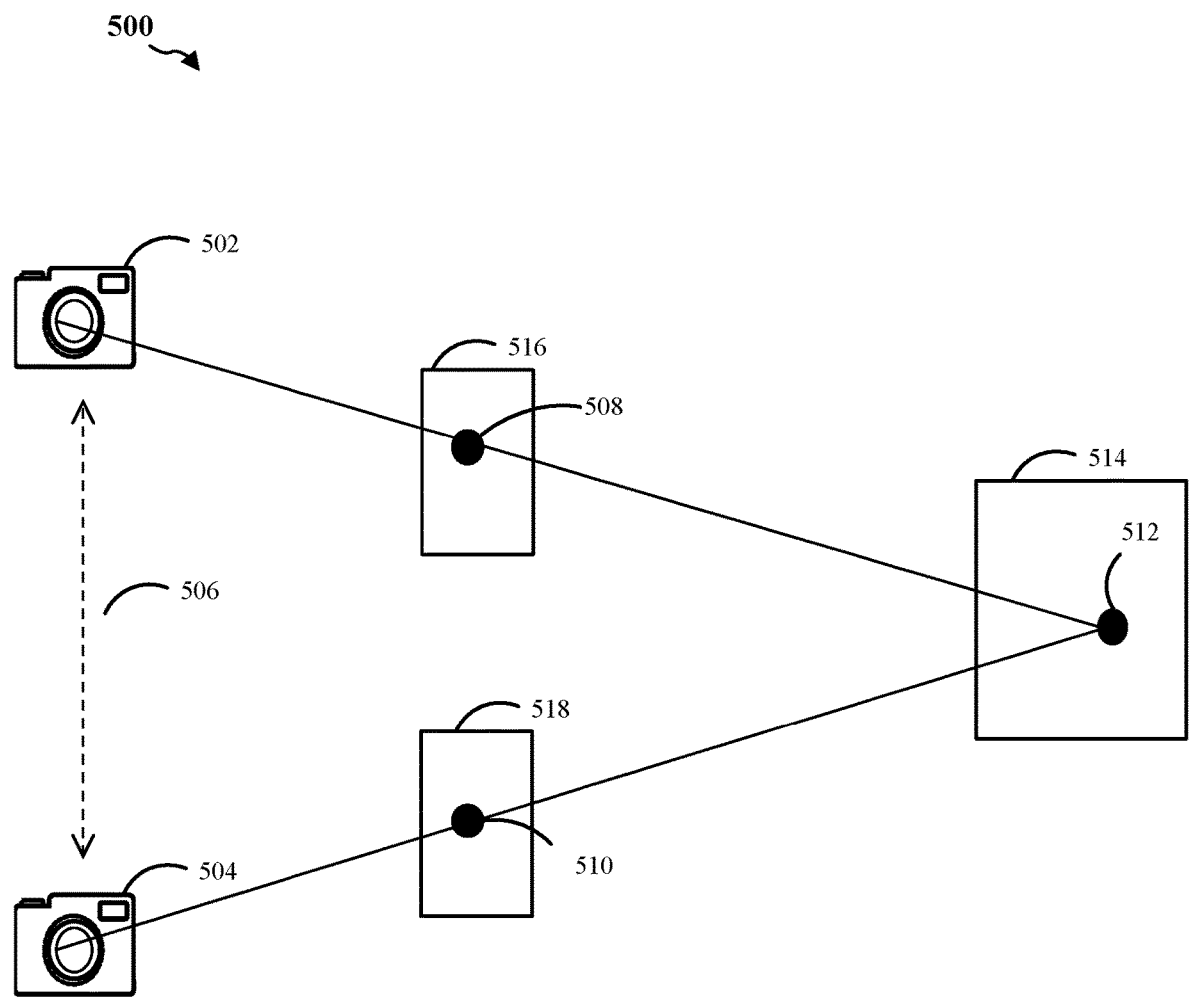
FIG. 5 illustrates an example of stereo-vision cameras according to aspects of the present disclosure.

FIG. 5 illustrates an example of a depth sensor 500 according to an aspect of the present disclosure. As shown in FIG. 5, the depth sensor 500 includes a first camera 502 and a second camera 504 that are spaced apart a known distance 506. As shown in FIG. 5, both cameras 502, 504 are focused on a specific point 512 of an object 514. Furthermore, the location of a first pixel 508 corresponding to the specific point 512 in a first image 516 is determined for the first camera 502 and the location of a second pixel 510 corresponding to the specific point 512 in a second image 518 is determined for the second camera 504. Based the location of the first pixel 508 and second pixel 510, using triangulation, the robot may determine the depth of the specific point 512 of the object 514 from the cameras 502, 504. The process of determining the depth may be repeated for multiple pixels (e.g., each pixel) of the images obtained by the camera to create a depth map of the robot's current location.

Although not shown in FIG. 5, the cameras 502, 504 may be mounted on the robot's nose (e.g., front). A three-dimensional reconstruction may be developed based on stereo depth perception. In one configuration, the process discretizes the world into a three-dimensional grid. Each location in the grid may be referred to as a voxel. A depth image from the stereo camera and a six-degree of freedom pose from the localization process may be combined into a three-dimensional voxel map as the robot navigates around an environment and observes obstacles. In one configuration, the voxel map is generated based on the observation. Additionally, the mapping process may run at the stereo camera frame rate, such that the map is updated as new information is observed by the cameras. The update may be substantially instantaneous. Furthermore, the voxel map may be used by a motion planner to plan safe and reliable paths in real-time.

Visual-inertial odometry may provide localization information to the planner, which may be updated in real-time. In one configuration, when a target is specified for the robot, the planner uses a latest state estimate as a starting state and the target as a goal to generate a plan for reaching the goal. The robot may execute the plan by following a computed trajectory in a closed-loop manner. As the plan is executed, new information is observed that may invalidate the plan, in which case the planner adopts a new plan.

Figure 6A:
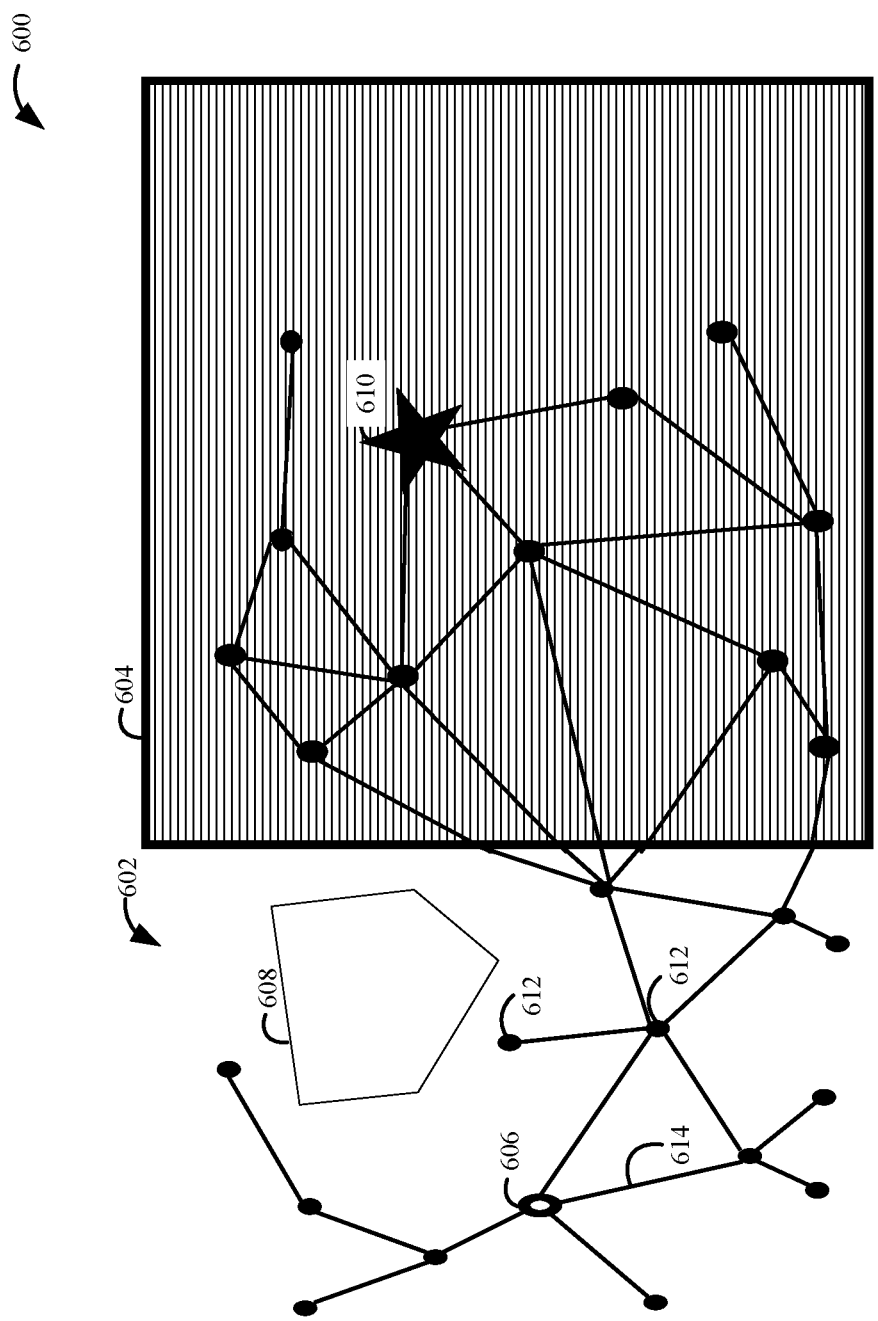
FIGS. 6A, 6B, 6C, 6D, 6E, and 7 illustrate examples of a robot in an environment according to aspects of the present disclosure.

FIG. 6A illustrates an example of an environment 600 that includes a mapped area 602 and an un-mapped area 604. The mapped area 602 may be a 3D mapped area based on depth measurements and localization. That is, as previously discussed, the 3D map may be generated by integrating the depth map with the localization information. The depth map and localization information may be obtained while the robot is operated in a manual mode (e.g., via user input) or an autonomous mode. As shown in FIG. 6A, based on the depth measurements, the robot may determine that certain voxels are occupied by an object 608. Thus, the planning module is specified to avoid the object 608 when the robot is navigated in a manual mode or an autonomous mode. The un-mapped area 604 may be an area that has yet to be explored by the robot.

In one configuration, the robot may be at a first location 606 and may receive user input to autonomously navigate to a target location 610. As shown in FIG. 6A, the target location 610 may be in an un-mapped area 604. In response to the user input, the robot selects candidate points 612 in unoccupied areas of the mapped area 602. The candidate points 612 may be randomly selected from the unoccupied areas of the mapped area 602. The candidate points 612 may be points on the mapped area 602 that are deemed safe for travel. Thus, the candidate points 612 may be used by the planning module to select a collision-free trajectory from the first location 606 to the target location 610. That is, the robot plans trajectories 614 (e.g., edges) between each of the candidate points 612. As shown in FIG. 6A, the robot may select candidate points 612 and trajectories 614 in the un-mapped area 604. Still, because the un-mapped area 604 has yet to be explored, the candidate points 612 and trajectories 614 are predicted candidate points 612 and predicted trajectories 614.

Figure 6B:
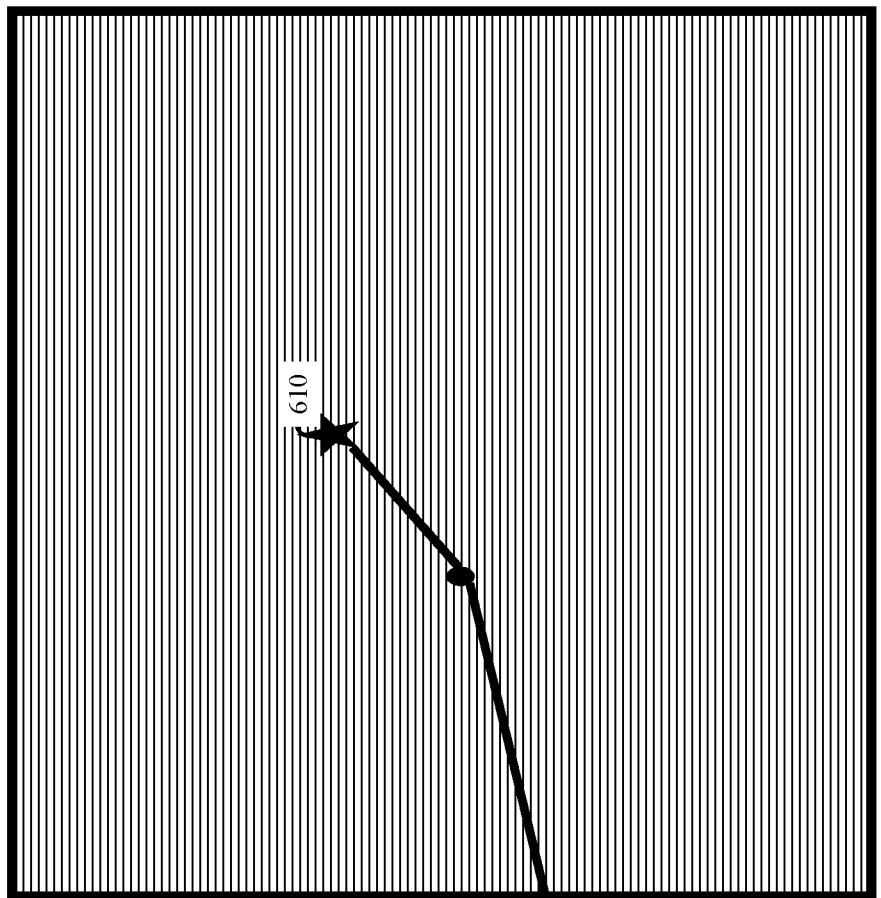

FIG. 6B illustrates an example of a selected path 620 between the first location 606 and the target location 610 according to an aspect of the present disclosure. As shown in FIG. 6B, after determining the candidate points 612 and trajectories 614, the planning module may search the various paths available between the first location 606 and the target location 610 based on the determined candidate points 612 and trajectories 614. The search may be a Dykstra search. Based on a search of the different paths, the planning module selects a path 620 for the robot to travel. The selected path is a collision free path. Furthermore, the selected path 620 may use fewer resources, such as gas, and/or time in comparison to other paths. The selected path 620 may be referred to as the minimum cost path.

Figure 6C:
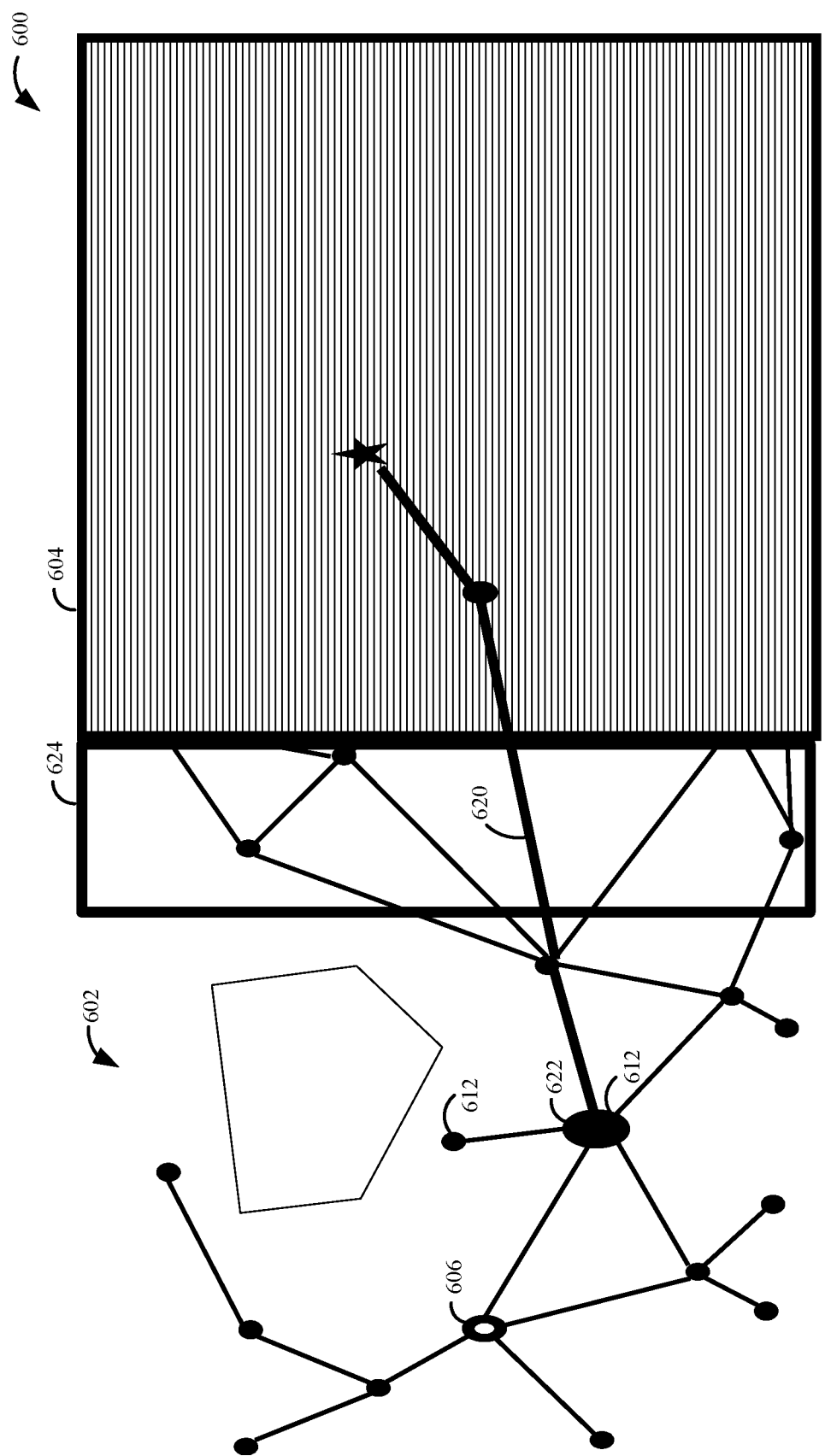

FIG. 6C illustrates an example of the robot moving along the selected path 620 according to an aspect of the present disclosure. As shown in FIG. 6C, based on the selected path 620, the robot moves from a first location 606 to a second location 622 along the path 620. The second location 622 is one of the candidate points 612 selected during the planning phase. Additionally, as shown in FIG. 6C, as the robot moves along the path 620, a portion of the un-mapped area 604 becomes mapped as the area comes into view of the robot's sensors. That is, as an example, as shown in FIG. 6C, an area 624, which was previously included in the un-mapped area 604, becomes included in the mapped area 602 based on the robot's movement. Thus, as the robot moves along the path 620, the robot may alter the selected path based on updated depth maps and location information.

Figure 6D:
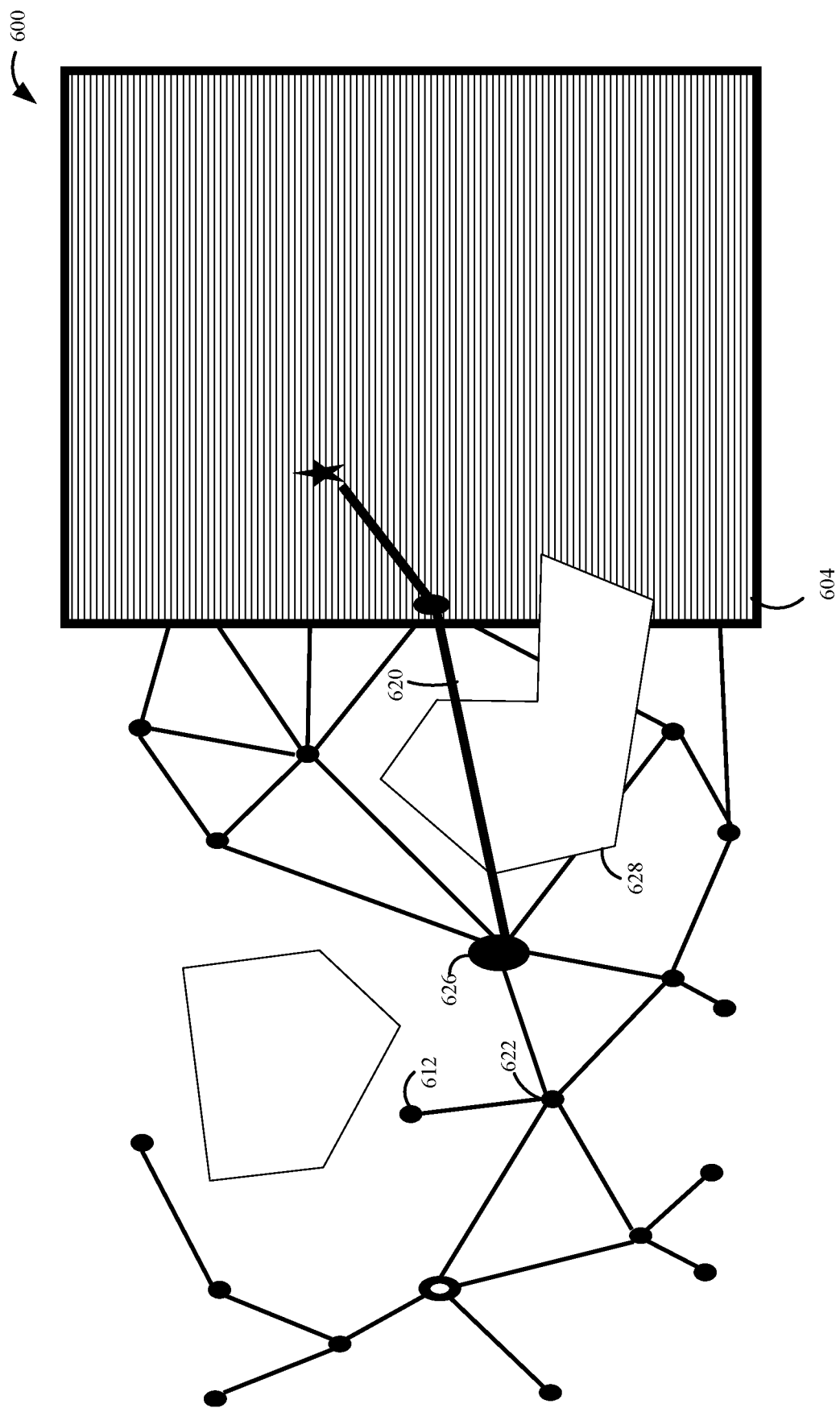

FIG. 6D illustrates an example of the robot moving along the selected path 620 according to an aspect of the present disclosure. As shown in FIG. 6D, based on the selected path 620, the robot moves from the second location 622 to a third location 626 along the path 620. The third location 626 is one of the candidate points 612 selected during the planning phase. Additionally, as shown in FIG. 6D, as the robot moves along the path 620, a portion of the un-mapped area 604 becomes a mapped area as that area comes into view of the robot's sensors. In this example, based on the depth measurements, the robot determines that an object 628 occupies the voxels along the planned path 620. Thus, if the robot were to continue along the planned path 620, a collision would occur. Accordingly, given that an object 628 overlaps the planned path 620, the planning module of the robot selects a new path based on the updated depth measurements and location information.

Figure 6E:
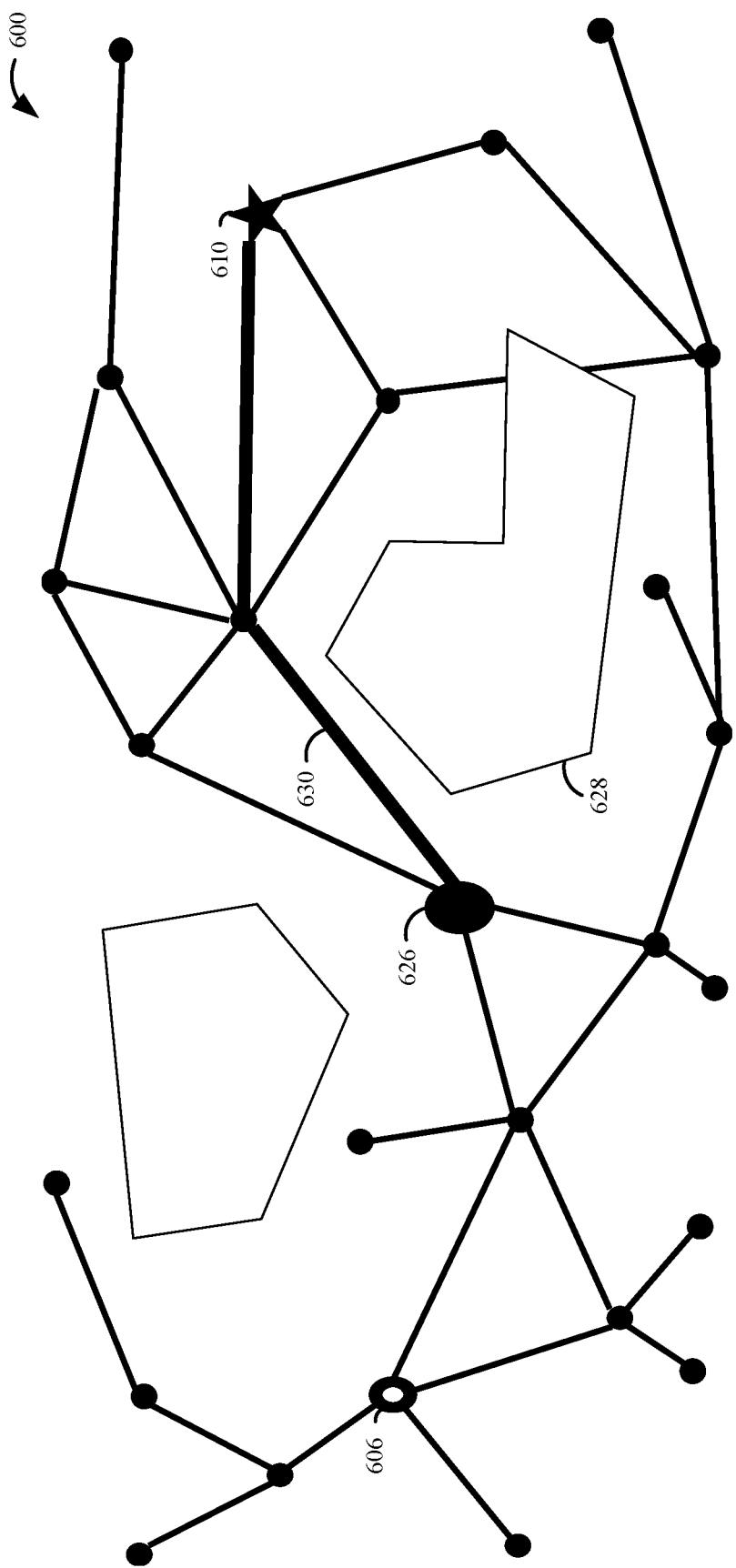

FIG. 6E illustrates an example of a robot selecting a new path 630 based on an updated 3D map. As previously discussed, the planning module of the robot selects a new path based on the updated depth measurements and location information (e.g., the updated 3D map). As shown in FIG. 6E, when the robot is at the third location 626, given the knowledge of the object 628, the planning module searches for new paths between the third location 626 and the target location 610. That is, the robot selects a new path when an obstacle, such as the object 628, comes into view. Based on a search of the different paths, the planning module selects a new path 630 for the robot to travel. As previously discussed, the selected path 630 may be referred to as the minimum cost path. For brevity, FIG. 6E does not illustrate an un-mapped area 604. Still, in this example, when the robot is in the third location 626, a portion of the environment 600 may still be un-mapped. Furthermore, the new path 630 may be updated again as the robot moves receives updated depth maps and location information as the robot moves along different points of the path 630.

Figure 7:
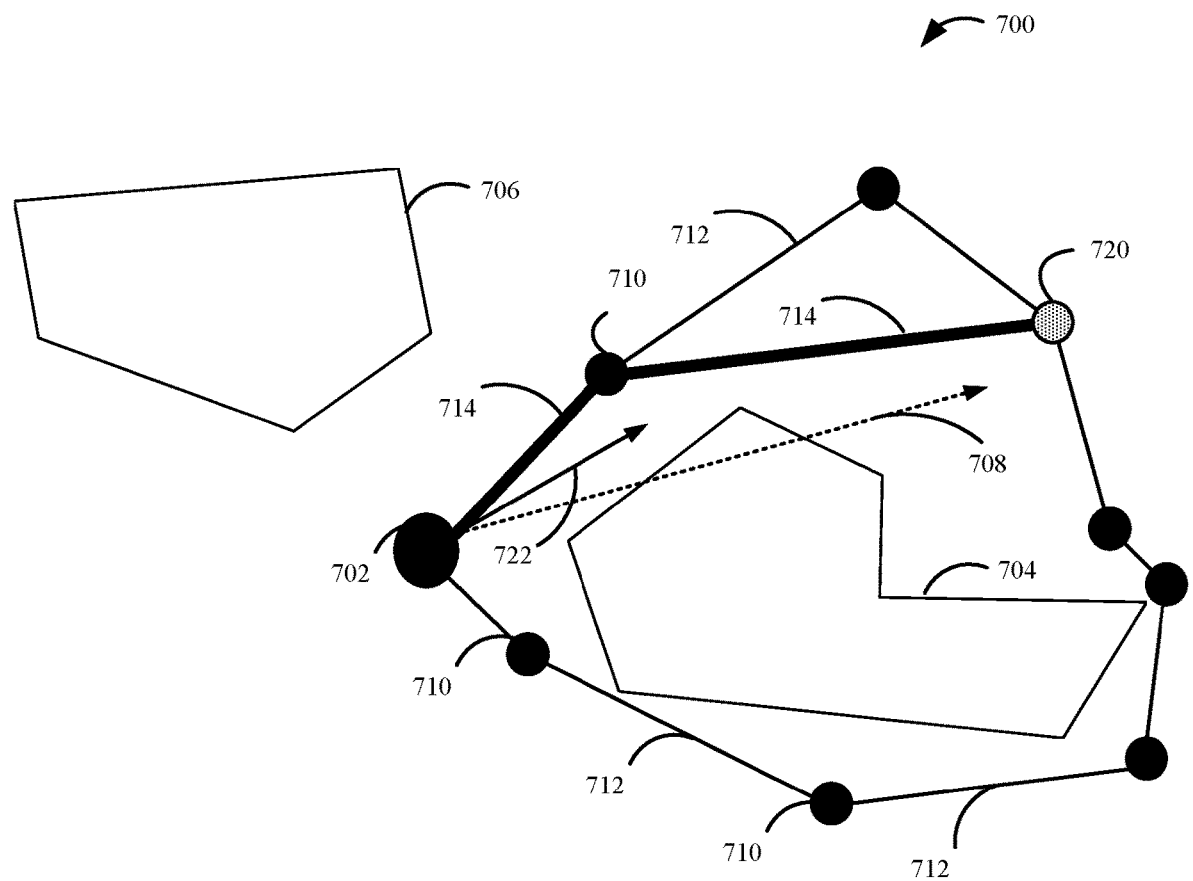

FIG. 7 illustrates an example of a robot 702 in a mapped environment 700 according to an aspect of the present disclosure. The mapped environment 700 may be a 3D mapped area based on depth measurements and localization. That is, as previously discussed, the 3D map may be generated by integrating the depth map with the localization information. The depth map and localization information may be obtained while the robot is operated in a manual mode (e.g., via user input) or an autonomous mode. As shown in FIG. 7, based on the depth measurements, the robot 702 may determine that certain voxels are occupied by a first object 706 and a second object 704. Thus, the planning module is specified to avoid the first object 706 and the second object 704 when the robot is navigated in a manual mode or an autonomous mode.

In one configuration, the robot 702 receives user input to move along a first trajectory 708. The first trajectory 708 may be specified to reach a target 720. Alternatively, the first trajectory 708 may not be target oriented. Additionally, or alternatively, the user input may specify a velocity. Based on the generated 3D map, the robot 702 has knowledge that the first trajectory 708 received via user input will cause a collision with the second object 704.

In one configuration, the planning module overrides the user input and plans a second trajectory 722 to avoid the second object 704. The second trajectory 722 may be randomly selected to avoid the obstacle. Furthermore, the second trajectory 722 may not be target oriented. Furthermore, the second trajectory 722 may cause the motors of the robot 702 to navigate on the second trajectory 722 instead of the first trajectory 708. Additionally, or alternatively, the override may adjust the velocity of the robot 702. If the environment is a 3D environment, the planning module may still maintain the first trajectory 708. However, the planning module may override the planned altitude so that the robot 702 travels over or under the first object, if possible.

In another configuration, the robot performs motion planning to avoid the collision. The motion planning may include randomly selecting safe points in the mapped area 700 (e.g., the 3D map). For example, the robot may randomly select candidate points 710 as alternate navigation points. The randomly selected candidate points 710 may be points on the map that are deemed safe for travel (e.g., collision-free areas of the map). The randomly selected candidate points 710 may be candidate points within a pre-determined proximity to the user designated path (e.g., the first trajectory 708). Of course, aspects of the present disclosure are not limited to selecting candidate points within a pre-determined proximity to the user designated path, as points outside the pre-determined proximity may also be selected.

Additionally, as shown in FIG. 7, to override the user-input to avoid the collision, the robot may determine one or more collision-free paths 712 between the randomly selected candidate points 710. To avoid the collision, the robot may travel along one of the collision-free paths from an initial position of the robot 702 to one of the randomly selected candidate points 710. Additionally, after reaching one of the randomly selected candidate points 710, the robot may select another path to other randomly selected candidate points 710, until the robot 702 reaches the target 720 or until the robot 702 receives a new user input.

Moreover, in one configuration, after determining one or more collision-free paths 712, the robot may determine a minimum cost path between the initial position and the target 720. The minimum cost path may use fewer resources, such as gas, and/or time, in comparison to other paths. In the example of FIG. 7, the robot selects a minimum cost path 714 to avoid the collision predicted from the first trajectory 708. Finally, although not shown in FIG. 7, the robot may change the selected path if a new obstacle were to materialize when the robot is traveling along one of the collision-free paths 712, such as the minimum cost path 714.

Figure 8:
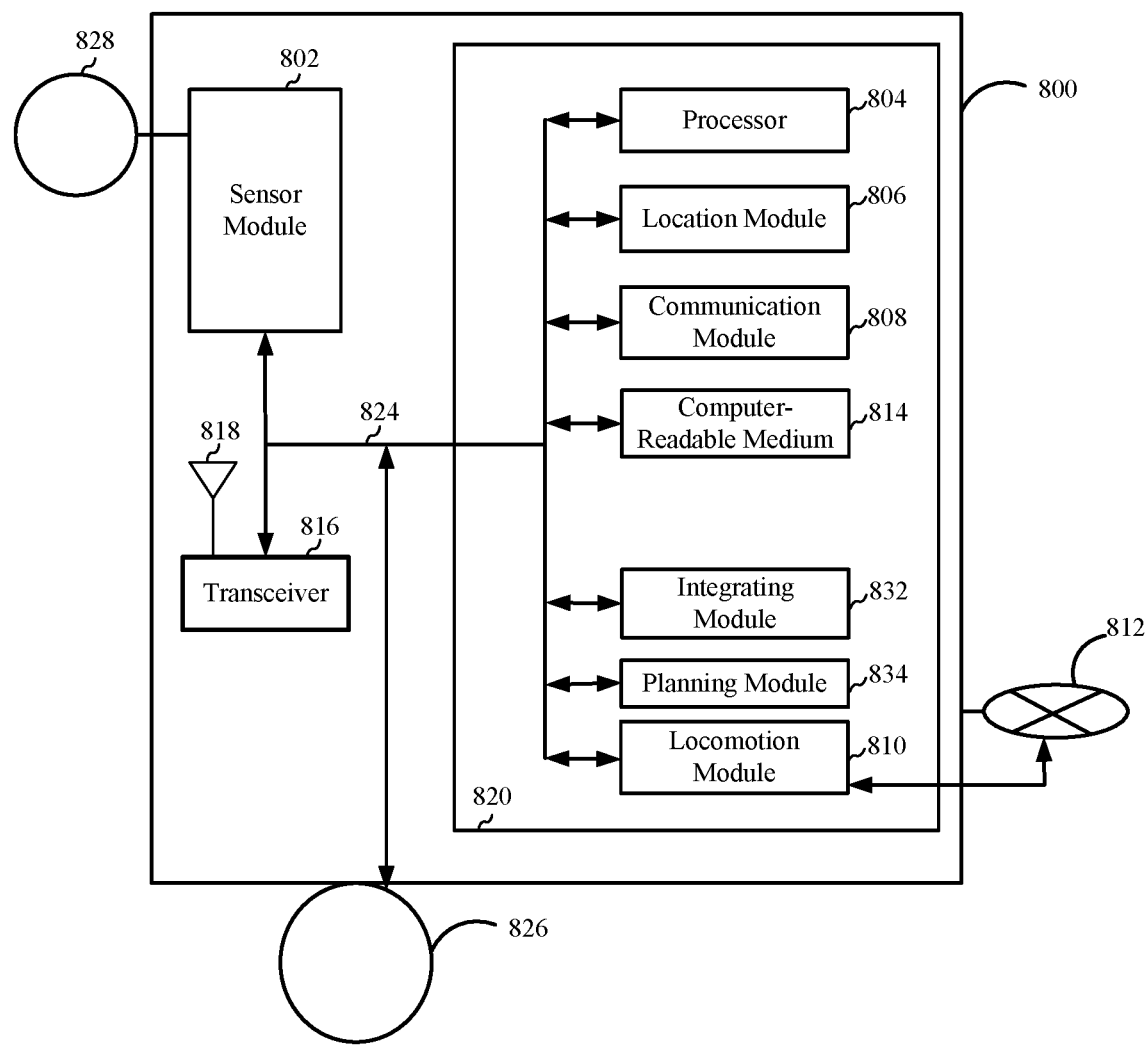
FIG. 8 is a block diagram illustrating different modules/means/components in an exemplary apparatus.

FIG. 8 is a diagram illustrating an example of a hardware implementation for an apparatus 800, such as a robot, employing a processing system 820. The processing system 820 may be implemented with a bus architecture, represented generally by the bus 824. The bus 824 may include any number of interconnecting buses and bridges depending on the specific application of the processing system 820 and the overall design constraints. The bus 824 links together various circuits including one or more processors and/or hardware modules, represented by the processor 804 the communication module 808, location module 806, sensor module 802, locomotion module 810, and the computer-readable medium 814. The bus 824 may also link various other circuits such as timing sources, peripherals, voltage regulators, and power management circuits, which are well known in the art, and therefore, will not be described any further.

The apparatus 800 includes a processing system 820 coupled to a transceiver 816. The transceiver 816 is coupled to one or more antennas 818. The transceiver 816 enables communicating with various other apparatus over a transmission medium. For example, the transceiver 816 may receive user input via transmissions from the user. The processing system 820 includes a processor 804 coupled to a computer-readable medium 814. The processor 804 is responsible for general processing, including the execution of software stored on the computer-readable medium 814. The software, when executed by the processor 804, causes the processing system 820 to perform the various functions described for any particular apparatus. The computer-readable medium 814 may also be used for storing data that is manipulated by the processor 804 when executing software.

The sensor module 802 may be used to obtain measurements via a first sensor 828 and a second sensor 826. The first sensor 828 may be a stereo-vision sensor, for performing measurements, such as a stereoscopic camera. The second sensor 826 may be a camera and/or an inertial measurement unit. Of course, aspects of the present disclosure are not limited to a stereo-vision sensor as other types of sensors, such as, for example, radar, thermal, sonar, and/or lasers are also contemplated for performing measurements. The measurements of the first sensor 828 and the second sensor 826 may be processed by one or more of the processor 804 the communication module 808, location module 806, locomotion module 810, the computer-readable medium 814, and other modules 832 834. As previously discussed, the measurements from the first sensor 828 may be used to obtain depth measurements. Furthermore, the measurements from the second sensor 826 may be used for localization. For example, the measurements from the second sensor 826 may be used by to location module 806 to determine a location of the apparatus 800. Furthermore, the measurements of the first sensor 828 and the second sensor 826 may be transmitted to an external device by the transceiver 816. The first sensor 828 and the second sensor 826 are not limited to being defined external to the apparatus 800, as shown in FIG. 8, the first sensor 828 and the second sensor 826 may also be defined within the apparatus 800.

The location module 806 may be used to determine a location of the apparatus 800. The communication module 808 may use the transceiver 816 to send and receive information, such as the location of the apparatus 800, to an external device. The locomotion module 810 may be used to provide locomotion to the apparatus 800. As an example, locomotion may be provided via rotary blades 812. Of course, aspects of the present disclosure are not limited to providing locomotion via rotary blades 812 and are contemplated for any other type of component for providing locomotion, such as propellers, wheels, treads, fins, and/or jet engines.

The processing system 820 includes an integrating module 832 for integrating a depth map with localization information to generate a three-dimensional (3D) map. The processing system 820 also includes a planning module 834 for planning a motion based at least in part on the 3D map, the localization information, and/or a user input. In one configuration, the motion planning overrides the user input when the user input is expected (e.g., predicted) to cause a collision. The modules may be software modules running in the processor 804, resident/stored in the computer-readable medium 814, one or more hardware modules coupled to the processor 804, or some combination thereof.

Figure 9:
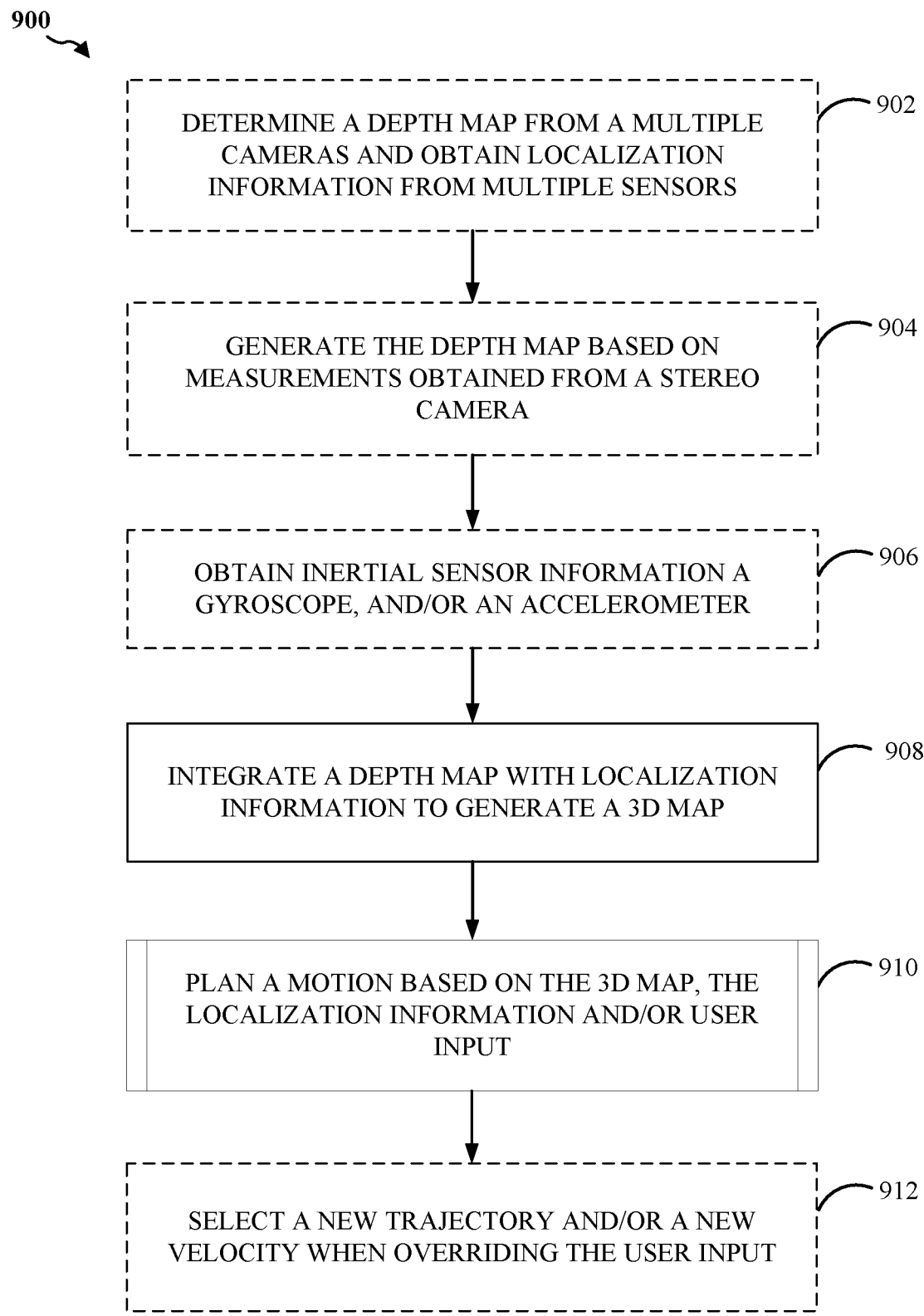
FIG. 9 illustrates a flow diagram for a method for autonomous visual navigation by a robot according to aspects of the present disclosure.

FIG. 9 illustrates a method 900 for visual navigation for a robot. In block 902, in an optional configuration, the robot determines a depth map from multiple cameras and obtains localization information from multiple sensors. That is, the robot may include multiple sensor modalities. The depth measurements may be performed at each time step to determine a distance of multiple points from the robot. A mapping module may use a sensor, such as a stereo-vision sensor, to obtain a depth map. Thus, in one optional configuration, at block 904, the robot generates the depth map based on measurements obtained from a stereo camera.

Furthermore, the robot may obtain localization information from the inertial sensor information. Thus, in one optional configuration, at block 906, the robot obtains inertial sensor information from a gyroscope and/or an accelerometer unit. The localization information may also be obtained from sensors, such as downward facing sensors. Localization refers to the location of the robot within an environment. In one configuration, the downward facing sensor is a sonar sensor and/or a camera.

Additionally, in block 908, a robot integrates a depth map with localization information to generate a 3D map. For example, the robot may obtain depth measurements at a first location and the robot associates the measurements with the first location of the robot. Additionally, the robot may move from the first location to a second location and obtain new depth measurements. Furthermore, the robot may associate the new depth measurements with the second location. Accordingly, the map, such as a 3D map, is generated based on the depth measurements and localization measurements as the robot moves through an environment.

Furthermore, in block 910, the robot plans motion based on the 3D map, the localization information, and/or user input. In one configuration, when a target is specified for the robot, a motion planner of the robot uses a latest state estimate as a starting state and the target as a goal to generate a plan for reaching the goal. The robot may execute the plan by following a computed trajectory in a closed-loop manner. As the plan is executed, new information is observed that may invalidate the plan, in which case the planner adopts a new plan. Additionally, or alternatively, the motion planning may override the user input when the user input is predicted to cause a collision. Moreover, the motion planning may override the user input when a trajectory and/or a velocity, received via the user input is predicted to cause a collision In an optional configuration, in block 912, the robot selects a new trajectory and/or a new velocity when overriding the user input. For example, the user input may specify a velocity and/or a trajectory. Based on the generated 3D map, the robot has knowledge that the user selected velocity and/or a trajectory will cause a collision with an object. Thus, in this configuration, the planning module overrides the user input and plans a new trajectory and/or velocity to avoid the second object.

Figure 10:
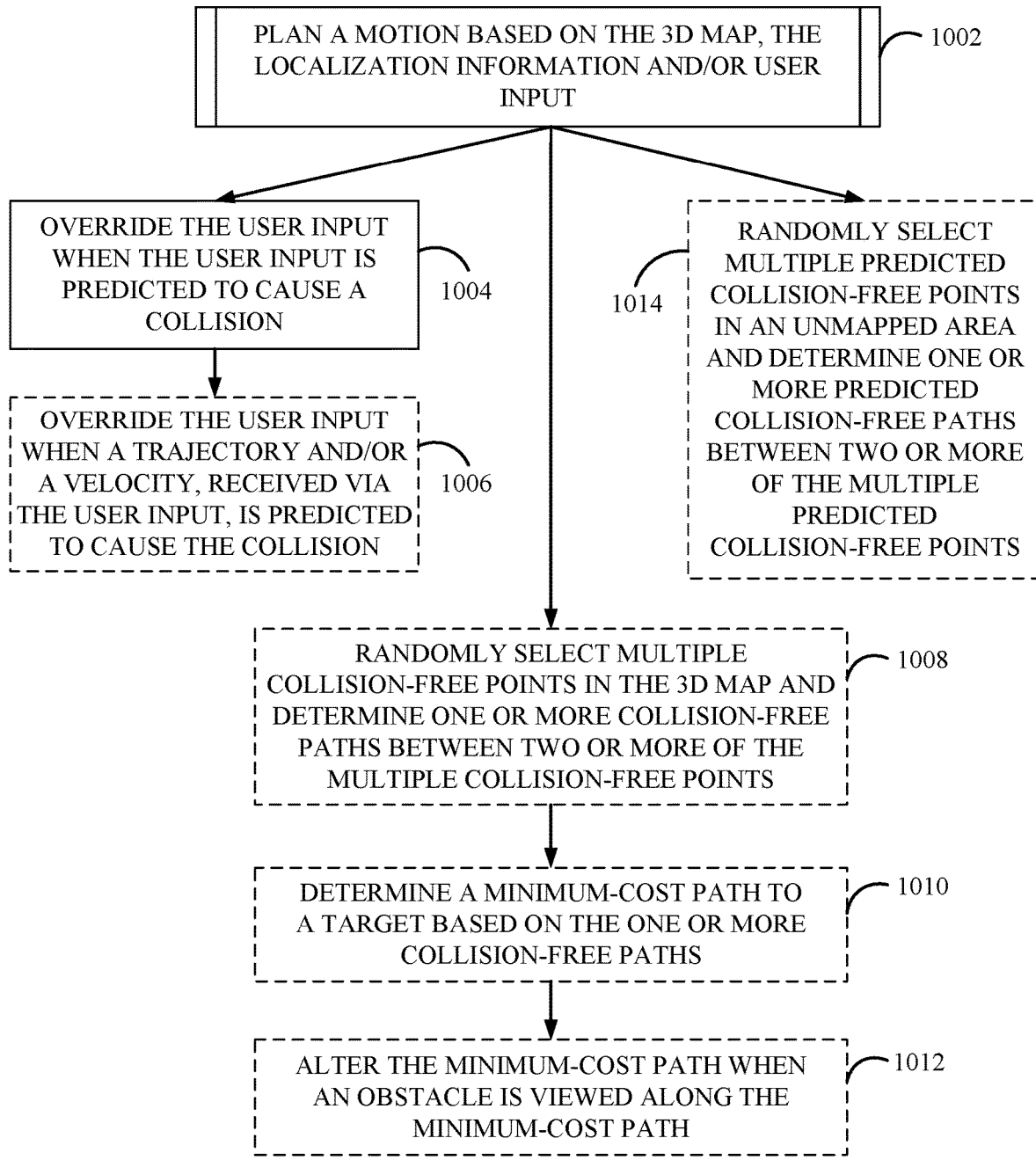
FIG. 10 illustrates a flow diagram for a method for motion planning according to aspects of the present disclosure.

FIG. 10 illustrates a more detailed method 1000 for motion planning. In block 1002, which is similar to block 910 of FIG. 9, the robot plans motion based on the 3D map, the localization information, and/or user input. In block 1004, the motion planning overrides the user input when the user input is predicted to cause a collision. Additionally, in an optional configuration, in block 1006, the motion planning overrides the user input when a trajectory and/or a velocity, received via the user input, is predicted to cause the collision.

In another optional configuration, in block 1008, the motion planning randomly selects multiple collision-free points in the 3D map and determines one or more collision-free paths between two or more of the multiple collision-free points. Additionally, in the optional configuration, in block 1010, the motion planning further determines a minimum-cost path to a target based on the one or more collision-free path. Moreover, after determining the minimum-cost path, in block 1012, the motion planning may further alter the minimum-cost path when an obstacle is viewed along the minimum-cost path.

In yet another optional configuration, in block 1014, the motion planning randomly selects multiple predicted collision-free points in an unmapped area and determines one or more predicted collision-free paths between two or more of the multiple predicted collision-free points.

In some aspects, the methods 900 and 1000 may be performed by the SOC 100 (FIG. 1) the system 200 (FIG. 2), or the apparatus 800 (FIG. 8). That is, each of the elements of methods 900 and 1000 may, for example, but without limitation, be performed by the SOC 100, the system 200, the apparatus 800, or one or more processors (e.g., CPU 102, local processing unit 202, processor 804) and/or other components included therein.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all of which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium.

Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of visual navigation for a robot, comprising:
   integrating a depth map of a spatial area with a localization information to generate a three-dimensional (3D) map;
   motion planning, based on the 3D map, for the robot to reach a target in an unmapped area that is distinct from the spatial area based on a plurality of paths determined from a plurality of first candidate points in unoccupied locations in the 3D map and a plurality of second candidate points in the unmapped area, depth measurements for the unmapped area being unavailable when motion planning;
   determining at least one predicted collision-free path between at least one of the plurality of first candidate points in the 3D map and one of the plurality of second candidate points in the unmapped area; and
   altering the motion planning based on depth measurements obtained by the robot while navigating on the at least one predicted collision-free path through a portion of the unmapped area.

2. The method of claim 1, further comprising:
   determining the depth map of the spatial area from a plurality of cameras; and
   obtaining the localization information from a plurality of sensors.

3. The method of claim 2, in which the localization information comprises at least one of an image information, an inertial sensor information, or a combination thereof.

4. The method of claim 3, further comprising obtaining the inertial sensor information from at least one of a gyroscope, an accelerometer, or a combination thereof.

5. The method of claim 1, further comprising generating the depth map of the spatial area based on measurements obtained from a stereo camera.

6. The method of claim 1, wherein altering the motion planning includes selecting at least one of a new trajectory, a new velocity, or a combination thereof.

7. The method of claim 1, further comprising:
   receiving a user input to navigate the robot;
   motion planning based at least in part on the 3D map and the user input; and
   overriding the user input when at least one of a trajectory, a velocity, or a combination thereof, received via the user input, is predicted to cause a collision.

8. The method of claim 1, further comprising:
   randomly selecting the plurality of first candidate points in the 3D map;
   determining at least one collision-free path between at least two of the plurality of first candidate points; and
   determining a minimum-cost path to the target based on the at least one collision-free path.

9. The method of claim 8, further comprising altering the minimum-cost path when an obstacle is viewed along the minimum-cost path.

10. The method of claim 1, further comprising randomly selecting the plurality of second candidate points in the unmapped area.

11. An apparatus, comprising:
    a memory; and
    at least one processor coupled to the memory, the at least one processor configured to:
      integrate a depth map of a spatial area with a localization information to generate a three-dimensional (3D) map;
      motion plan, based on the 3D map, for the robot to reach a target in an unmapped area that is distinct from the spatial area based on a plurality of paths determined from a plurality of first candidate points in unoccupied locations in the 3D map and a plurality of second candidate points in the unmapped area, depth measurements for the unmapped area being unavailable when motion planning;
      determine at least one predicted collision-free path between at least one of the plurality of first candidate points in the 3D map and one of the plurality of second candidate points in the unmapped area; and
      alter the motion planning based on depth measurements obtained by the robot while navigating on the at least one predicted collision-free path through a portion of the unmapped area.

12. The apparatus of claim 11, in which the at least one processor is further configured to:
    determine the depth map of the spatial area from a plurality of cameras; and
    obtain the localization information from a plurality of sensors.

13. The apparatus of claim 12, in which the localization information comprises at least one of an image information, an inertial sensor information, or a combination thereof.

14. The apparatus of claim 13, in which the at least one processor is further configured to obtain the inertial sensor information from at least one of a gyroscope, an accelerometer, or a combination thereof.

15. The apparatus of claim 11, in which the at least one processor is further configured to generate the depth map of the spatial area based on measurements obtained from a stereo camera.

16. The apparatus of claim 11, wherein altering the motion planning includes selecting at least one of a new trajectory, a new velocity, or a combination thereof.

17. The apparatus of claim 11, in which the at least one processor is further configured to:
   receive a user input to navigate the robot;
   motion plan based at least in part on the 3D map and the user input; and
   override the user input when at least one of a trajectory, a velocity, or a combination thereof, received via the user input, is predicted to cause a collision.

18. The apparatus of claim 11, in which the at least one processor is further configured to:
   randomly select the plurality of first candidate points in the 3D map;
   determine at least one collision-free path between at least two of the plurality of first candidate points; and
   determine a minimum-cost path to the target based on the at least one collision-free path.

19. The apparatus of claim 18, in which the at least one processor is further configured to alter the minimum-cost path when an obstacle is viewed along the minimum-cost path.

20. The apparatus of claim 11, in which the at least one processor is further configured to randomly select the plurality of second candidate points in the unmapped area.

21. An apparatus, comprising:
   means for integrating a depth map of a spatial area with a localization information to generate a three-dimensional (3D) map;
   means for motion planning, based on the 3D map, for the robot to reach a target in an unmapped area that is distinct from the spatial area based on a plurality of paths determined from a plurality of first candidate points in unoccupied locations in the 3D map and a plurality of second candidate points in the unmapped area, depth measurements for the unmapped area being unavailable when motion planning;
   means for determining at least one predicted collision-free path between at least one of the plurality of first candidate points in the 3D map and one of the plurality of second candidate points in the unmapped area; and
   means for altering the motion planning based on depth measurements obtained by the robot while navigating on the at least one predicted collision-free path through a portion of the unmapped area.

22. The apparatus of claim 21, further comprising:
   means for determining the depth map of the spatial area from a plurality of cameras; and
   means for obtaining the localization information from a plurality of sensors.

23. The apparatus of claim 22, in which the localization information comprises at least one of an image information, an inertial sensor information, or a combination thereof.

24. The apparatus of claim 23, further comprising means for obtaining the inertial sensor information from at least one of a gyroscope, an accelerometer, or a combination thereof.

25. The apparatus of claim 21, further comprising means for generating the depth map of the spatial area based on measurements obtained from a stereo camera.

26. The apparatus of claim 21, wherein the means for altering the motion planning includes selecting at least one of a new trajectory, a new velocity, or a combination thereof.

27. The apparatus of claim 21, further comprising:
   means for receiving a user input to navigate the robot;
   means for motion planning based at least in part on the 3D map and the user input; and
   means for overriding the user input when at least one of a trajectory, a velocity, or a combination thereof, received via the user input, is predicted to cause a collision.

28. The apparatus of claim 21, further comprising:
   means for randomly selecting the plurality of first candidate points in the 3D map;
   means for determining at least one collision-free path between at least two of the plurality of first candidate points; and
   means for determining a minimum-cost path to the target based at least in part on the at least one collision-free path.

29. The apparatus of claim 28, further comprising means for altering the minimum-cost path when an obstacle is viewed along the minimum-cost path.

30. The apparatus of claim 21, further comprising means for randomly selecting the plurality of second candidate points in the unmapped area.

31. A non-transitory computer-readable medium having program code recorded thereon for providing visual navigation to a robot, the program code executed by a processor and comprising:
   program code to integrate a depth map of a spatial area with a localization information to generate a three-dimensional (3D) map;
   program code to motion plan, based on the 3D map, for the robot to reach a target in an unmapped area that is distinct from the spatial area based on a plurality of paths determined from a plurality of first candidate points in unoccupied locations in the 3D map and a plurality of second candidate points in the unmapped area, depth measurements for the unmapped area being unavailable when motion planning;
   program code to determine at least one predicted collision-free path between at least one of the plurality of first candidate points in the 3D map and one of the plurality of second candidate points in the unmapped area; and
   program code to alter the motion planning based on depth measurements obtained by the robot while navigating on the at least one predicted collision-free path through a portion of the unmapped area.

32. The non-transitory computer-readable medium of claim 31, in which the program code further comprises:
   program code to determine the depth map of the spatial area from a plurality of cameras; and
   program code to obtain the localization information from a plurality of sensors.

33. The non-transitory computer-readable medium of claim 32, in which the localization information comprises at least one of image information, an inertial sensor information, or a combination thereof.

34. The non-transitory computer-readable medium of claim 33, in which the program code further comprises program code to obtain the inertial sensor information from at least one of a gyroscope, an accelerometer, or a combination thereof.

35. The non-transitory computer-readable medium of claim 31, in which the program code further comprises program code to generate the depth map of the spatial area based on measurements obtained from a stereo camera.

36. The non-transitory computer-readable medium of claim 31, wherein the program code to alter the motion plan includes program code to select at least one of a new trajectory, a new velocity, or a combination thereof.

37. The non-transitory computer-readable medium of claim 31, further comprising:
  program code to receive a user input to navigate the robot;
  program code to motion plan based at least in part on the 3D map and the user input; and
  program code to override the user input when at least one of a trajectory, a velocity, or a combination thereof, received via the user input, is predicted to cause a collision.

38. The non-transitory computer-readable medium of claim 31, further comprising:
  program code to randomly select the plurality of plurality of first candidate points in the 3D map;
  program code to determine at least one collision-free path between at least two of the plurality of first candidate points; and
  program code to determine a minimum-cost path to the target based on the at least one collision-free path.

39. The non-transitory computer-readable medium of claim 38, further comprising program code to alter the minimum-cost path when an obstacle is viewed along the minimum-cost path.

40. The non-transitory computer-readable medium of claim 31, further comprising program code to randomly select the plurality of second candidate points in the unmapped area.

* * * * *